UNITED STATES PATENT OFFICE.

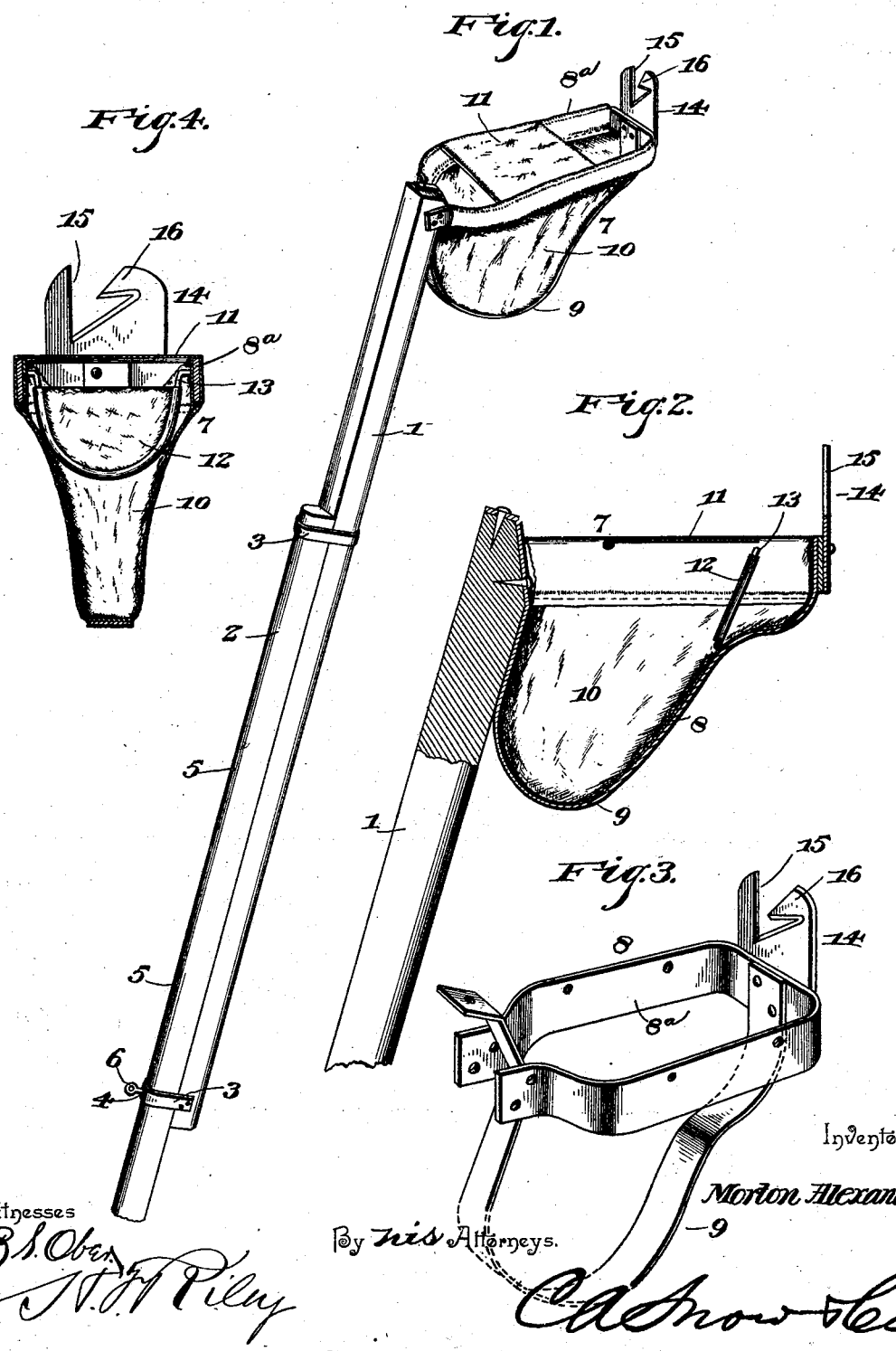

MORTON ALEXANDER, OF IRELAND, INDIANA.

FRUIT-GATHERER.

SPECIFICATION forming part of Letters Patent No. 508,905, dated November 21, 1893.

Application filed June 21, 1893. Serial No. 478,355. (No model.)

*To all whom it may concern:*

Be it known that I, MORTON ALEXANDER, a citizen of the United States, residing at Ireland, in the county of Dubois and State of Indiana, have invented a new and useful Fruit-Gatherer, of which the following is a specification.

The invention relates to improvements in fruit gatherers.

The object of the present invention is to improve the construction of fruit gatherers, and to provide a simple and inexpensive one adapted to sever readily the stems of fruit, and capable of lowering the latter to the ground without liability of spilling it.

The invention consists in the construction and novel combination and arrangement of parts hereinafter fully described, illustrated in the accompanying drawings and pointed out in the claims hereto appended.

In the drawings—Figure 1 is a perspective view of a fruit gatherer constructed in accordance with this invention. Fig. 2 is a longitudinal sectional view of the basket or receptacle for holding the fruit. Fig. 3 is a detail perspective view of the frame of the basket or receptacle. Fig. 4 is a transverse sectional view of the receptacle or basket.

Like numerals of reference indicate corresponding parts in all the figures of the drawings.

1 and 2 designate sliding pole sections, each provided at its adjacent end with an encircling band or loop 3 receiving the other pole section; and the lower band or loop is provided with a perforation 4 and is adapted to register with any one of a series of perforations 5, and to receive a locking pin 6 for securing the sections of the pole at any desired adjustment to enable the fruit gatherer to be increased or diminished in length to adapt it for picking fruit from high or low trees. The pole has secured to its top a basket 7, which consists of a frame 8, and a fabric covering attached to the frame and arranged on the inside thereof. The frame consists of an oblong top portion 8ª constructed of metal and secured to the pole at opposite sides of the upper section thereof, and a depending supporting portion 9 having a curved bottom and an inclined outer side secured to the outer end of the top portion 8. The depending portion of the supporting frame is approximately U-shaped and receives a fabric sack or bag 10 for holding the picked fruit. The fabric bag or sack is provided with an intermediate top portion 11, forming an entrance opening at the outer portion of the frame and a discharge opening at the inner end of the top of the frame; and it is provided with a depending swinging flap 12 provided with a stiffening frame 13 and adapted to close the entrance mouth or opening of the basket or receptacle when the fruit gatherer is lowered to prevent the fruit falling from the receptacle.

A knife 14 is secured to the outer end of the top portion of the frame and extends upward therefrom, and is provided with a V-shaped slot or opening 15 forming a downwardly projecting blade 16 having a lower inclined cutting edge adapted to sever readily the stems of fruit.

It will be seen that the fruit gatherer is simple and comparatively inexpensive in construction, that it is adapted to be increased or diminished in length to adapt it to the height of the fruit, and that it is capable of readily severing the fruit, and of safely lowering the same to the ground without liability of bruising or otherwise injuring the fruit.

Changes in the form, proportion and the minor details of construction may be resorted to without departing from the principle or sacrificing any of the advantages of this invention.

The depending supporting portion of the frame of the basket or receptacle is provided at its outer side near the top with an inward bend against which the lower end of the swinging flap bears when the fruit gatherer is being lowered. This enables the swinging flap to close the mouth or entrance of the basket or receptacle to prevent the fruit spilling during lowering.

What I claim is—

1. A fruit gatherer comprising a pole, a receptacle with an intermediate transverse top portion forming entrance and discharge openings at the outer and inner ends of the receptacle, a swinging flap adapted to close the entrance opening, and a knife, substantially as described.

2. A fruit gatherer comprising a receptacle provided with an intermediate top portion forming entrance and discharge openings at the outer and inner ends of the receptacle, a pole carrying the receptacle, a hinged frame arranged within the receptacle and supporting a swinging flap to close the entrance opening, substantially as described.

3. In a fruit gatherer, the receptacle having a swinging flap 12 faced with cloth or other suitable material and arranged within the receptacle adjacent to the entrance opening and adapted to close the latter when the fruit gatherer is lowered, substantially as described.

In testimony that I claim the foregoing as my own I have hereto affixed my signature in the presence of two witnesses.

MORTON ALEXANDER.

Witnesses:
JOSEPH EGG,
HERMAN ECKERT.